United States Patent [19]

Weiden

[11] Patent Number: 4,784,203

[45] Date of Patent: Nov. 15, 1988

[54] METHOD AND APPARATUS FOR MOUNTING AND REMOVING A PNEUMATIC TIRE

[75] Inventor: Michael Weiden, Messel, Fed. Rep. of Germany

[73] Assignee: Schenck-Auto-Service-Gerate, Fed. Rep. of Germany

[21] Appl. No.: 902,207

[22] Filed: Aug. 29, 1986

[30] Foreign Application Priority Data

Sep. 4, 1985 [EP] European Pat. Off. ........ 85111131.0

[51] Int. Cl.$^4$ ............................................. B60C 25/06
[52] U.S. Cl. ................................... 157/1.24; 157/1.17
[58] Field of Search ................. 157/1, 1.17, 1.22, 1.24

[56] References Cited

U.S. PATENT DOCUMENTS

| 1,766,727 | 6/1930 | Steele | 157/1.22 X |
| 3,528,475 | 9/1970 | Duquesne | 157/1.24 |
| 3,780,785 | 12/1973 | Schultz et al. | 157/1.24 |
| 4,610,288 | 9/1986 | Huinink et al. | 157/1.22 |
| 4,694,875 | 9/1987 | Goebel | 157/1.24 |

FOREIGN PATENT DOCUMENTS

| 1480989 | 1/1979 | Fed. Rep. of Germany | 157/1.17 |
| 3334203A1 | 4/1985 | Fed. Rep. of Germany | . |
| 3438615 | 4/1986 | Fed. Rep. of Germany | 157/1 |
| 3520801 | 12/1986 | Fed. Rep. of Germany | 157/1.17 |

Primary Examiner—Debra Meislin
Attorney, Agent, or Firm—Connolly and Hutz

[57] ABSTRACT

Process and apparatus for mounting or demounting a vehicular pneumatic tire comprises positioning the tire beads within the inner circumference of a wheel during mounting of the tire. Beads are removed from within the interior of the wheel rim when the tire is demounted. The tire beads are subject to elastic deformation in order to reduce the bead diameter which then enables positioning of the bead within the interior of the wheel rim or removal of the bead from within the rim interior.

7 Claims, 9 Drawing Sheets

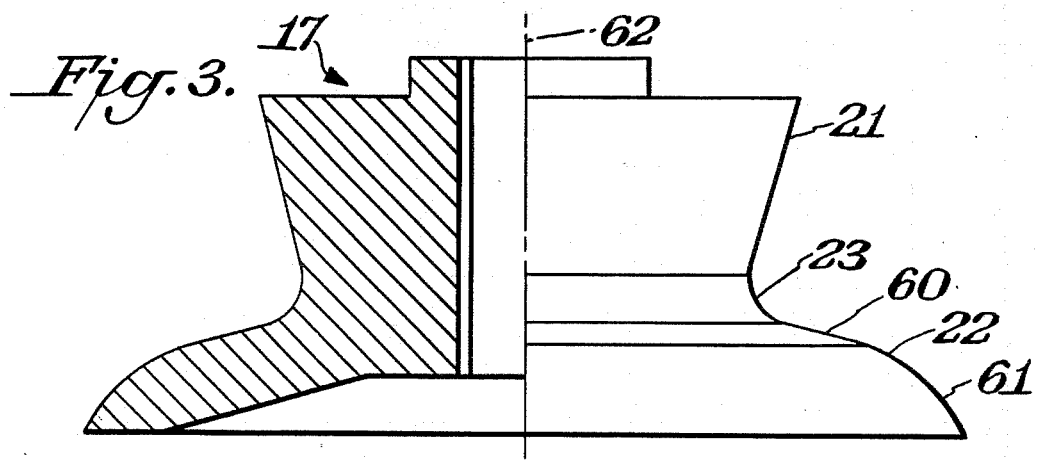
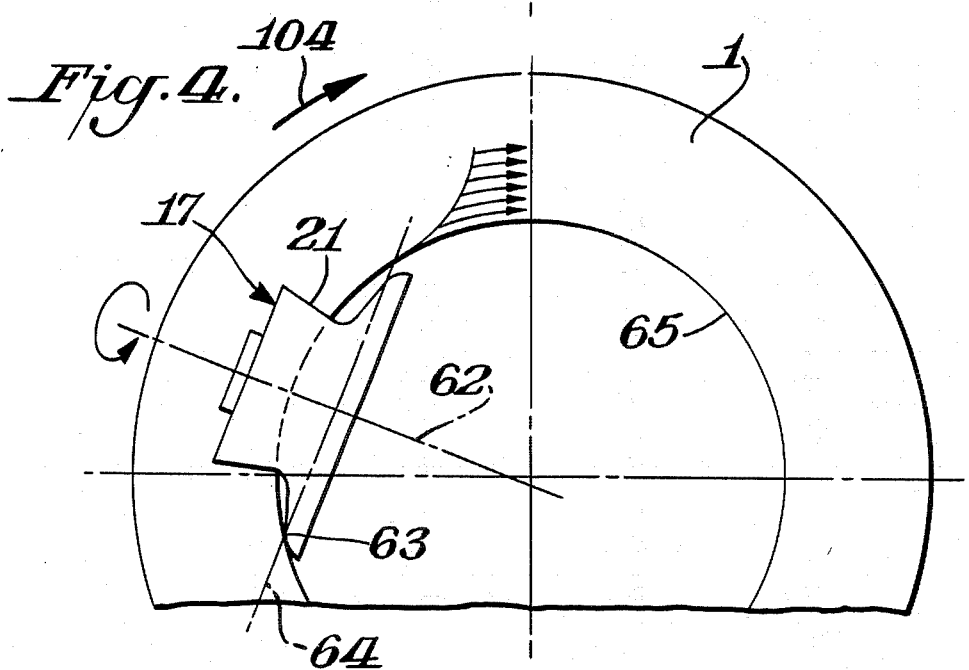
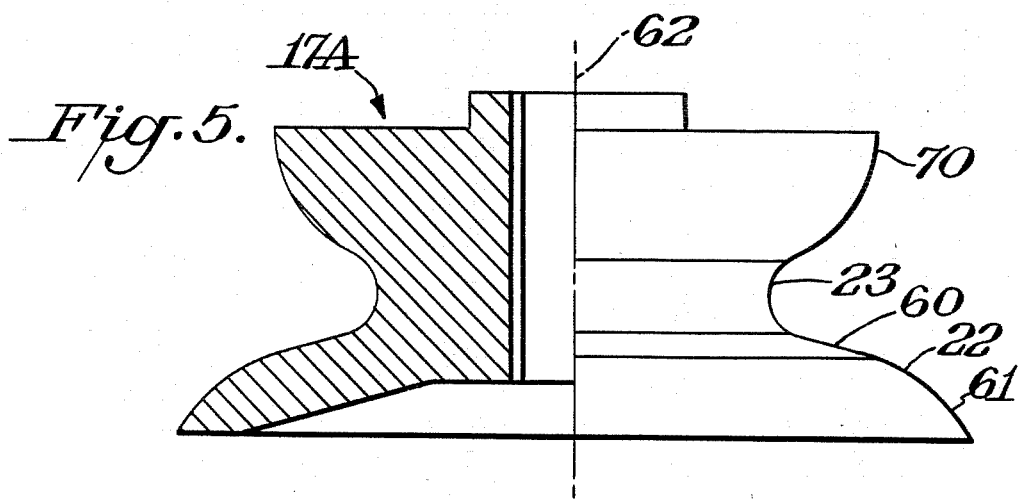

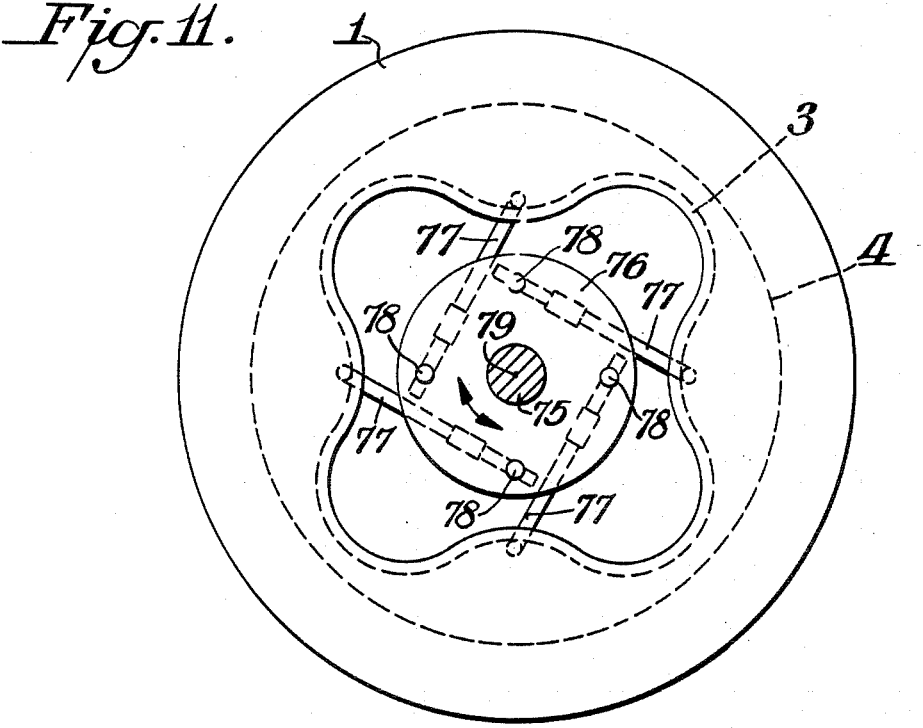
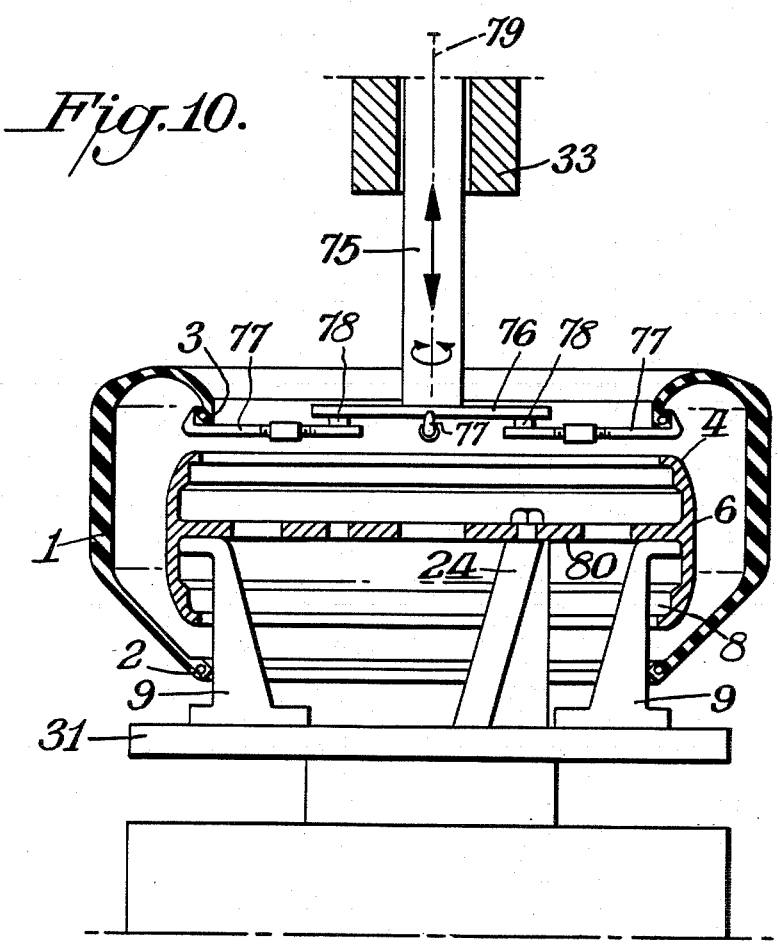

METHOD AND APPARATUS FOR MOUNTING AND REMOVING A PNEUMATIC TIRE

BACKGROUND OF THE INVENTION

The present invention relates to a method and apparatus for mounting and removing a pneumatic tire relative to a wheel rim and more particularly to a method and apparatus for mounting the beads of a pneumatic tire within the interior of a wheel rim and for removing the beads therefrom during removal of the tire from the rim.

Through German disclosure DE No. 33 34 203 A1, a device of the above description is generally known which uses a mounting aid for holding the bead after placing part of the bead in a high bed. After holding the bead, the tire is mounted by using a driver roller which engages the bead. The circumferential speed of the roller is greater than that of the roll-off speed of the tire. A mounting method of this type requires two work processes—one of holding and one of mounting the bead on the rim. If in this case the turnable mounting plate is driven, then the holding device and the mounting device in the center of the mounting plate must be turnable. This leads to difficulties when a tire which surrounds the rim loosely is put on for mounting. Specifically, the tire and the rim can get caught on the centrally located, rotatable holding or mounting device. This inevitably leads to an expensive changing of such a mounting devise. In addition, significant forces come into play at the bead area of the vehicular pneumatic tire when using such a mounting method. These forces can lead additionally to damaged beads if the surfaces of the mounting roller are profiled.

SUMMARY OF THE INVENTION

An object of this invention is a method and apparatus for mounting or demounting a tire which through elastic changes in the bead area and the steel ropes contained in the bead, permits insertion or loosening of the bead into or away from the interior of a wheel rim. The method achieves this objective through elastic deformation of the tire bead including the steel ropes. Through elastic deformation of the bead diameter at one point, the bead diameter becomes much smaller than the rim inside diameter thereby allowing placement of the bead within the interior of the rim.

Through axially inward force on the rotating bead, a continuous radial reduction of the diameter is obtained so that the tire to be mounted runs into a groove on the inside of the rim. When demounting the tire from the rim, the same rotating force obtains a deformation which necessarily reduces the bead diameter in the radial direction so that at that point the bead loosens from the groove and is lifted out of the groove by using an appropriate tool. The deformation procedure is strengthened, if the rotating force has a differential speed compared to the tire to be mounted and both are moved in the same direction.

Forces acting in the direction of the tire axis, mostly in the plane of the bead, deform the bead simultaneously at several points so that a reduction of the diameter is obtained. This makes it possible to run the bead into the inner groove of the rotating rim through the inner diameter of the rim without an additional holding step. When the deforming forces are removed from the tire, the elastic deformation ceases and the tire is solidly mounted into the groove in the rim.

A force component which acts axially in the direction of the bead may also be applied in order to demount through the inner rim diameter without the need of a holding devise.

A guide roller is used to apply axial forces to the tire bead. The roller has a first frusto-conical surface which functions to hold the bead against the rim and a second surface that elastically deforms the tire bead thereby reducing its diameter while axially forcing the deformed bead into the interior of the rim. A free space between the two roller surfaces provides the necessary space for the beads to be mounted as the deformatin progresses. The second surface of the guide roller has a longer radius of rotation when compared to the first surface. Hence, as the guide roller, bead and rim rotate, the surface speed of the first surface of the roller is generally the same as the bead and rim while the speed of the second surface of the guide roller is greater than the bead. This differential speed causes a force to be exerted on the inner radial ring of the bead which has the effect that the bead itself including the steel ropes contained therein are elastically deformed and drawn into the area between the two roller surfaces. This makes it possible through one revolution of the tire to achieve a rotating deformation of the bead. Such deformation enables the bead to run into a groove located within the interior of the rim.

The guide roller itself may act as a hold-down device without the necessity of an additional stop in the radial direction. In this case the guide roller is mounted to an arm pivoted to a vertical column mounted outside the turning radius of the tire to be mounted. The guide roller on the arm is moveable in horizontal and vertical directions and movement thereof is stoppable by an assumed force in the certical direction.

The annular relationship of the two surfaces of the guide rollers is such that they form an angle of about 90° while in another embodiment the angle is greater than 90° but less than 180°. In either embodiment this provides the free space as well as the difference in speed between the radial inner ring of the bead and the axial area of the bead, allowing an even simpler mounting or demounting of the tire.

During the demounting of a tire mounted on a rim, the rim is held on a turnable mounting plate, and the guide roller is brought into contact with the bead and stopped with an initial force applied in the axial direction. Reverse rotation with the differential speed defined above, caused by the larger rotational radius the second surface functions to draw the bead into the open space between the roller surfaces. This produces an elastic deformation and a raising of the tire bead from the outer side of the groove within the interior of the rim. The insertion of a demounting tool into the opening thus created between the running groove and the bead, makes it possible to run the bead out of the groove because of the elastic deformation.

The guide roller where the angle between the surfaces is between 90° and 180° is especially useful for the mounting of tires whose respective side walls form an angle of 90° to 180° related the tread of the tire, or for tires having especially stiff side walls with significant resistance against the running-in of the bead into the rotating groove of the rim. This design of this guide roller further enhances the holding down force so that additional stopping of the guide roller in the radial direction can be eliminated.

The elastic deformation of the tire is increased when the roller plane of the guide roller is vertical to the axis of the guide roller and forms a secant direction relative to the bead circle in the spherical part (convex) part of the guide roller. The draw-in via the cervex area of one flank is increased through this rolling action.

A pneumatic or hydraulic device may be arranged on the column to effect vertical movement of the arm and the guide roller connected thereto. Such device also functions to apply a specific pre-load of the roller on the tire bead of the tire being mounted or removed.

In another embodiment of the invention, rods with hooks attached thereto engage the tire bead and cause an elastic deformation of the bead and thus a reduction of the envelope curve of the deformed bead ring when the effective radius of the rods is reduced. This permits the bead to be mounted without further aids, because it can pass through the radial, inner diameter of the rim. The beads are brought into contact with the interior of the rim by relaxing the radially movable rods. After fixing the bead within the interior of the rim, the rods are removed by folding action around a joint.

Demounting of a tire on a rim with the modified apparatus occurs in reverse order. The hook shaped ends of the rods are first placed between the groove edge of the rim and the bead. After that all foot part move on the centrally located pillar in axial direction toward the tire under simultaneous stretching of the rod parts compared to the foot parts of the rods. Thus each hook moves between the rim and bead and grabs the bead from behind. After that the stretched hooks are moved in unison in the radial direction toward the turning axis of the tire, so that an elastic deformation of the bead ring is caused, which makes it possible to remove the bead danger-free through the inner, radial diameter of the rim, because the stretched rods with their hooks holding the bead from behind, are moved in axial direction away from the tire. After the bead is free of the rim in the axial direction, the rods are relaxed in radial direction, i.e. toward the outside the bead resumes it normal shape and the rods with their hooks can be removed without danger. Here it is practical, if the individual rods, which are mounted with their feet on a ring surrounding the central pillar are so movable, that they can fit into grooves on the pillar in the axial direction. The support, as well as the mounting and demounting rods are stationary with respect to each other.

BRIEF DESCRIPTION OF THE DRAWINGS

Novel features and advantages of the present invention in addition to those noted above will become apparent to those of ordinary skill in the art from a reading of the following detailed description in conjunction with the accompanying drawings wherein similar reference characters refer to similar parts and in which:

FIG. 3 is an enlarged elevational view of the guide roller of the device of FIGS. 1 and 2, with a portion thereof in section;

FIG. 4 is a diagrammic to plan view illustrating the operation of the guide roller of the device of FIGS. 1 and 2;

FIG. 5 is an enlarged elevational view similar to FIG. 3 but illustrating a modified guide roller;

FIG. 10 is a front elevational view partially in cross-section illustrating still another embodiment of a tire mounting and demounting device, according to the present invention;

FIG. 11 is a top plan view of the device of FIG. 10;

DETAILED DESCRIPTION OF THE DRAWINGS

Figure 1:
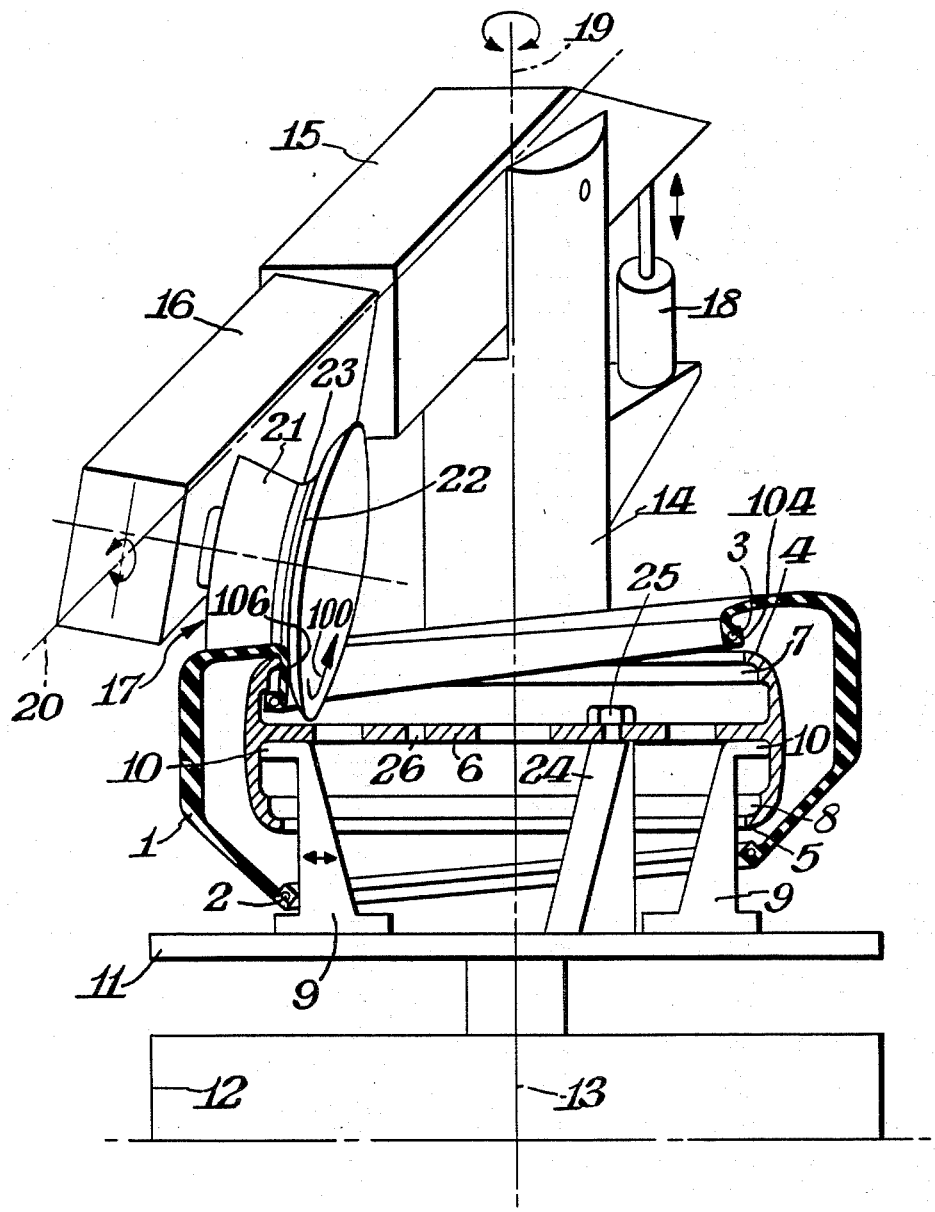
FIG. 1 is a pictorial view partially in cross-section illustrating a tire mounting and demounting device, according to the present invention.

Referring in more particularity to the drawing, FIG. 1 illustrates a vehicular pneumatic tire 1 to be mounted on a wheel rim 6 with the circular beads 2, 3 of the tire positioned over wheel flanges 4, 5 and located in grooves 7, 8 into the interior of the rim. At the start of the mounting procedure, the vehicular pneumatic tire 1 loosely surrounds the rim 6.

The rim 6 is firmly secured in place by several mounting hooks 9, which at their upper end possess protruding brackets 10 in the radial, outward direction. For securement purposes, the mounting hooks 9 are moved outward in a radial direction on a mounting plate 11 by means of guides (not shown) until the brackets 10 come in contact with the inner diameter of the rim 6. Since at least three hooks 9 are driven in a radial direction against the inner diameter of the rim 6, a secure centering of the rim is obtained. The mounting plate 11 is slowly turned around a rotational axis 13 and can be driven by a motor (not shown) positioned within a housing 12.

A post 14 is attached to the housing 12 and a swivel arm 15 is connected at the upper end of the post for tilting movement relative to the post about a horizontal axis. The arm includes a front end portion 16 which is movable about the axis 20. The turnable front end 16 carries a guide roller 17. The swivel arm 15 is raised and lowered with the aid of a e.g. pneumatic or hydraulic cylinder 18 securely fastened between post 14 and the arm. Due to the rotatability of the post 14 around vertical axis 19, the guide roller 17 is brought into contact with a bead area of the vehicular pneumatic tire 1. By rotating the front end 16 of the swivel arm 15 around the swivel arm axis 20, the guide roller 17, whose rotational axis is perpendicular to the swivel arm axis 20, is positioned so that a first surface 21 of the guide roller 17 works together with the axial part of the bead 3, while a second surface 22 works together with the radial inner ring of the bead 3. The first surface 21 is frusto-conical, while the second surface 22, especially in the work area with the inner ring of the bead is convex.

The force working in a vertical direction on the rim 6 and the vehicular pneumatic tire 1 is transmitted through the frusto-conical surface 21 of the guide roller. By raising the pressure in the cylinder 18, a certain initial pressure is produced, which serves also to self position the guide roller 17 against the tire. Such a mounting device thus needs no additional positioning aid, as is usual with the present state of the art. Such self-positioning of the guide roller results from rotation of the swivel arm 15 about its axis 20.

In order to mount the vehicular pneumatic tire 1 on the rim 6, the guide roller 17 is driven by a motor (not shown) mounted in the front part 16 of the swivel arm 15. The turning direction 100 of the guide roller 17 is counter-clockwise when viewed from the axis of the rotation of the mounting plate 11.

Also, the turning direction of the mounting plate is clockwise when the plate is viewed from above, as shown in FIG. 4. However, the turning speeds of the mounting plate 11 and guide roller 17 are different. As already shown, the second surface 22 of the guide roller 17, works against the inner edge of the bead 3. Through difference in speed between the vehicular pneumatic tire and the guide roller, a reduction of the diameter of the bead circle is initiated and further enhanced through a speed difference between the frusto-conical surface 21 and the convex surface 22. The speed difference is caused by the various touch radii of the frusto-conical surface 21 with the axial bead area and the convex surface 22 with the radial inner ring 104. There appears a further faster rolling of the inner ring 104 as compared to the axial part 106 of the bead which leads to the further reduction of the diameter of the bead. Through the arrangement of a channel 23 between the two surfaces 21 and 22 of the guide roller 17, a free space is produced, into which the shortened bead can expand as an elastic deformation. Through the vertically applied force, the vehicular pneumatic tire 1 is moved over the wheel flange 4, and the bead 3 can run into the rotating groove continuously without obstacle.

After one rotation of the rim 6, the vehicular pneumatic tire 1 is mounted with one bead. After turning the rim 6, the bead 2 is mounted through a second work process similar to the first. Part of the invention is, that instead of just a single guide roller, a second guide roller may be connected to work on the second bead, as described above, so that it takes but a single work process to guide the respective beads into the respective grooves to mount the tire completely.

When demounting the vehicular pneumatic tire 1 from the rim 6, the guide roller 17 is again brought into vertical contact with a specific initial load with the vehicular pneumatic tire 1. After contact, the mounting plate 11 and the guide roller 17 are moved in the same direction at different speeds. this causes a reduction of the bead diameter, as already described, which causes an elastic deformation. This elastic deformation causes a raising of the bead area from the outer flange 4 groove 7, and a demounting tool (not shown) can be inserted into this area between rim 6 and the vehicular pneumatic tire 1 for the demounting of the vehicular pneumatic tire 1 from the rim 6.

Figure 2:
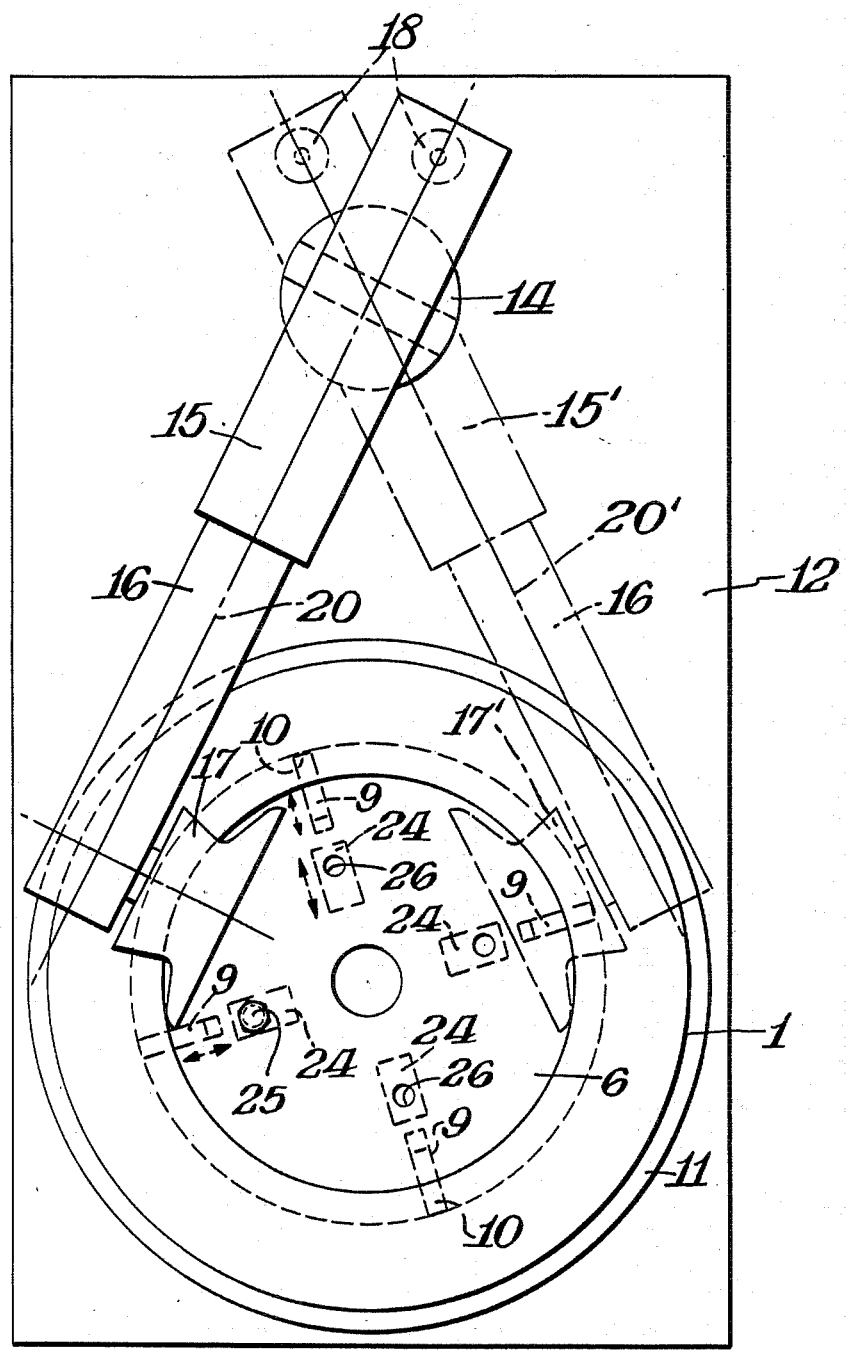
FIG. 2 is a top plan view of the device shown in FIG. 1.

From the top plan view of FIG. 2, it can be seen that the arrangement of the post 14 on the housing 12, outside the largest wheel diameter, offers the opportunity to mount and demount vehicular pneumatic tires of various diameters on their respective rims 6 without the use of additional hold-down devices for the guide roller 17 during the mounting process as was usual in the past. Independent of the tire and rim size, through variations in the length of the adjustable swivel arm 15, an inclined position of the axis of the guide roller relative to the horizontal can be reached similar to the roller position shown in FIG. 1. This inclining causes, with the help of the vertical force applied by the cylinder system 18 a self-positioning of the guide roller 17. Such self-positioning of the guide roller results from rotation of the swivel arm 15 about its axis 20 and the downward force on the roller produced by the cylinder 18. FIG. 2 also shows schematically in dash lines, the arrangement of a second swivel arm 15' with a guide roller 17' which allows a simultaneous work process to bring in the second bead into the second groove of rim 6. The second swivel arm 15' and guide roller 17' function to simultaneously elastically deform at least a portion of the other tire bead until the effective diameter thereof is reduced to a point where the other deformed tire bead portion is free to pass into or out of the interior of the rim past the other of the rim flanges. With this arrangement, it may be necessary to provide hold-down devices 24, movable in a radial direction on the mounting plate 11. The hold-down device 24 shown in FIGS. 1 and 2 secures the rim 6 on the mounting plate 11 with bolts 25 via bored holes 26.

Because of this arrangement of the post 14, outside the pneumatic vehicular tire 1, it is also possible, by swinging away the arm 15, 15' with the guide rollers 17, 17' to prepare this mounting device in simple manner for conventional tires, if a swivelling mounting and demounting device for such tires is placed on the post 14.

Figure 6:
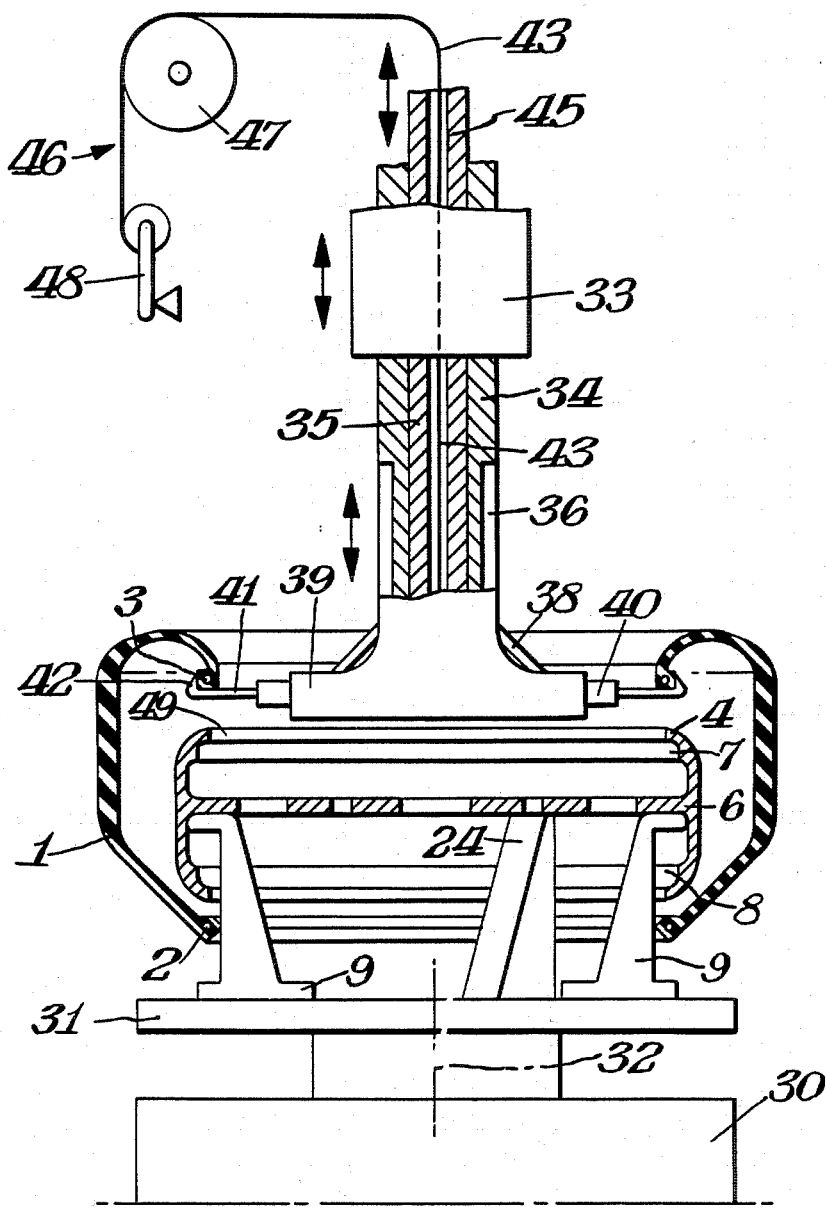
FIG. 6 is a front elevational view partially in cross-section illustrating an alternate embodiment of a tire mounting and demounting device, according to the present invention.
Figure 9:
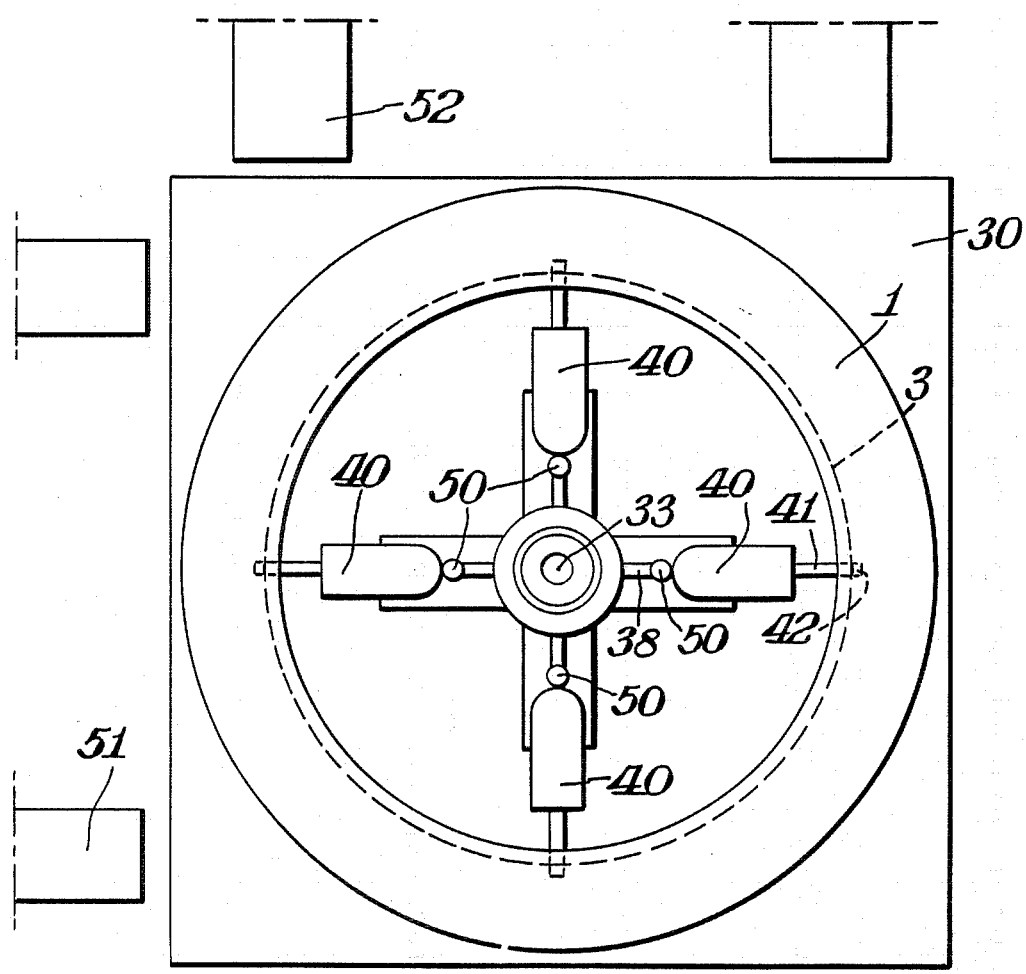
FIG. 9 is a top plan view of the tire mounting and demounting device shown in FIG. 6.

The device shown in FIGS. 1 and 2 can be used as well in the mounting of tires during the manufacture of automobiles. It is especially favorable for the mounting and demounting of vehicular pneumatic tires in garages. FIGS. 6 and 9 show an especially favorable mounting and demounting device for the mounting of vehicular pneumatic tires on automobiles. This mounting or demounting device can easily be integrated into an assembly line for automobile wheels, which additionally have rim feeders, tire feeders and measuring devices for concentricity and the determination of unbalance of the finished wheels.

Figure 7:
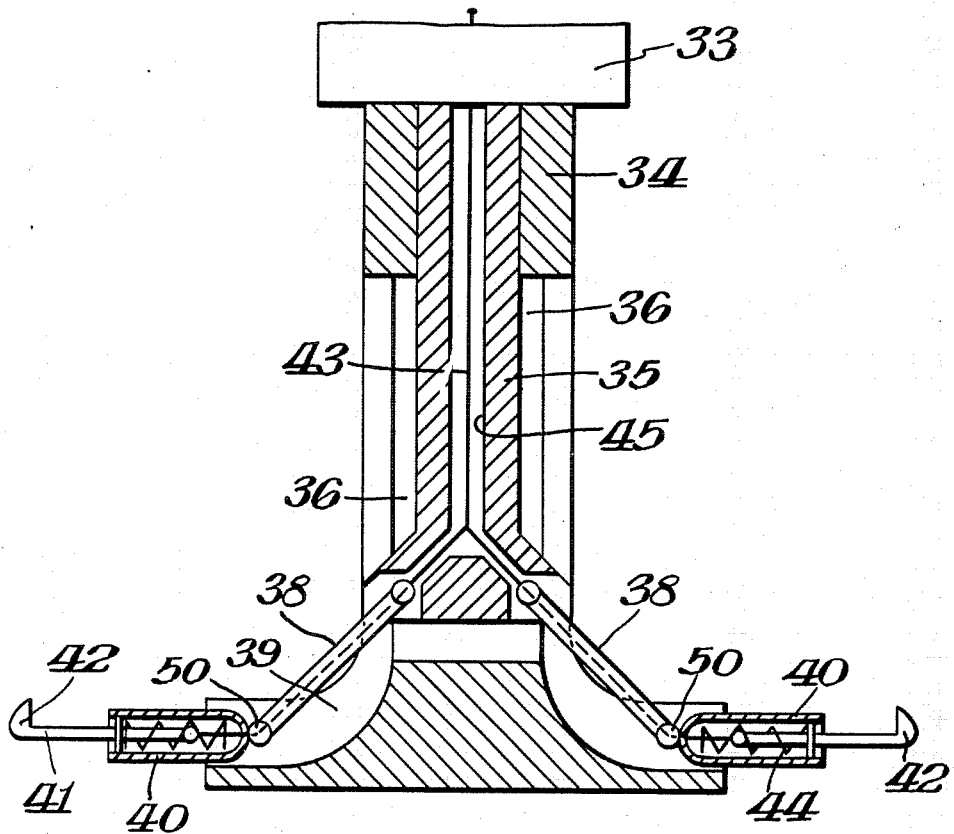
FIG. 7 is an enlarged longitudinal sectional view of the working portion of the device of FIG. 6 with the arms thereof extended.
Figure 8:
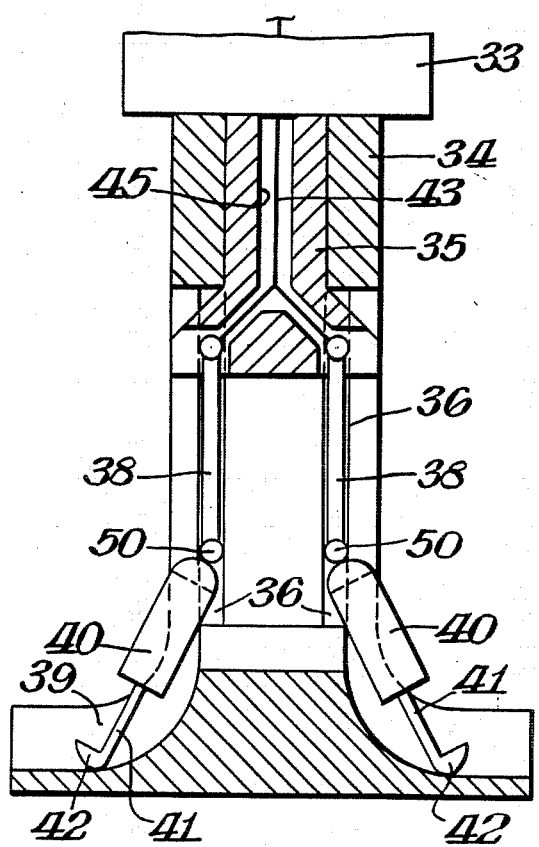
FIG. 8 is a view similar to FIG. 7 but illustrating the arms in their withdrawn vertical position.

FIGS. 6, 7 and 8 show an assembly 30 on which a base 31 is arranged. Clamping jaws 9 and/or hold-down device 24 are secured to the base 31 for radial movement thereon relative to the base centerline 32. By means of these clamping jaws 9 and/or hold-down devices 24, the rim 6 is concentrically secured around the center 32. Once the rim is so positioned, the jaws and/or hold-down devices are fixed in place on the base 31 by any suitable means (not shown).

A vertically movable work post 33 is positioned concentrically around the center 32, above the rim 6 and the vehicular pneumatic tire 1, which loosely surrounds the vehicular rim 6. A hollow shaft 34 is arranged within the moveable work post 33. Within the hollow shaft 34 is a raisable and lowerable piston 35. The raising and lowering movements can be conducted pneumatically, hydraulically or electrically.

The hollow shaft 34 has longitudinal slits 36, in which, rods 38 attached to the cylinder end are guided and moved. A guide 39 is positioned at the lower end of the hollow shaft 34. The guides enable the rods 38 to be moved from a vertical stored position to a horizontal extended position.

The rods 38 have a hollow bored foot section 40 in which the bead section 41 of the rods is set with the ability to move back and forth. At the free end of the head section 41 of the rods 38, hooks 42 are attached. Instead of the hooks 42, the free end of the bead section 41 can itself be formed into a hook. The other ends of the head sections 41, are pre-stressed to springs 44, via ropes 43 in the foot sections 40. The ropes 43 preferably lead through a boring 45 inside the cylinder 35 to a tensioning arrangement 46 consisting of a guide roller 47 and a tensioning device 48.

For mounting of a vehicular pneumatic tire 1 onto the rim 6, the working post 33 is lowered. The hollow shaft 34, with the rods 38 in the longitudinal slits 36 is lowered until the guides 39 of the hollow shaft 34 are somewhat below the upper wheel flange plane 49. In this position, the hollow shaft 34 is initially arrested and the piston 35 pushes the rods 38 with their foot sections 40 and head sections 41 via the longitudinal slots 36 and the guide 39 initially in a vertically downward and then a horizontal direction. After the rods 38, with the aid of the guides 39, have been stretched radially in a horizontal plane, they are extended radially to the point that the vehicular pneumatic tire can be put on without strain. The hooks 42 grab the bead from behind. Then the head sections 41, with the attached hooks 42, with the help of the ropes 43 and against the force of the springs 44 are pulled into the foot sections 40 of the rods 38 with the help of the tensioning device 48.

Through this force applied in a radially inward direction (see FIGS. 9 and 11) the bead is radially elastically deformed in an inward direction. This leads to a reduction of the ring surrounding the deformed bead. If this ring is smaller than the diameter of the wheel flange, the bead is moved through the wheel flange opening toward the rim in an axial direction without further expenditure of energy. This occurs through axial lowering of the hollow shaft 34. When the hollow shaft 34 with the rods 38 has reached a position inside the rim where the reduced bead ring is now below the wheel flange, the tensioning device 48 is released. Through the deformation tension in the bead caused by the elastic deformation, the bead is brought in contacting the area of the encircling groove 7. The hollow shaft 34 and the released tensioning device are then lifted. This brings the hooks 42 into a swinging motion which is supported by joints 50 attached to the foot section of the rods 38. Such causes the release of the hooks 42 from the bead 2 or 3, guiding them back into the longitudinal slots 36 with the help of the piston 35.

For mounting of the outer bead 2 or 3, the working post 33 with the hollow shaft 34 and the piston 35 is initially raised. The rim 6 with the vehicular pneumatic tire is thereon inverted on the clamping jaws 9 or the hold-down 24, centered around the center, and, for instance, secured again with the clamping jaws 9. The mounting process for the other bead 2 or 3, proceeds in the same fashion as described above.

For demounting, the rods with their head sections 41 are pushed out to the extent that they contact the inner upper surface of the rim. The hollow shaft is lowered axially, so that the hooks grab from behind the bead 2 or 3 attached to the encircling groove 7. After the hollow shaft 34 has been lowered to the point that the rods 38 are in the area of the wheel flange plane 49, the hooks 42 are stretched far enough through the tensioning device 48 so that the tire bead can be pulled off the upper surface of the rim through lowering of the hollow shaft 34. After the hooks 42 have reached a plane which is below the wheel flange 49, a further deformation inward of the bead 2 or 3 is produced by the tensioning device 48. This elastic deformation is increased, until the ring surrounding the deformed bead 2 or 3 is smaller than the wheel flange diameter. In this condition, the hollow shaft 34 is elevated and, after leaving the wheel flange plane 49, the head sections 41 with hooks 42 are released again by the tensioning device 48. The arrangement with the rods is then removed from the vehicular pneumatic tire 1.

In FIG. 9, the top view schematically shows in addition a roller arrangement 51 for feeding rims 6 and a feeding arrangement according to FIG. 6 for wheels consisting of rims and mounted tires. From FIG. 9, it can readily be understood that the mounting device according to FIG. 6 is especially useful for the manufacture of automobiles, because the centrally located work post 33 is not in the way through raising during the feeding step, i.e., when, via the roller arrangement 51 rims and via the feeding arrangement 52, vehicular, pneumatic tires 1 are fed.

FIGS. 3 and 4 show an enlarged guide roller 17 and FIG. 4 illustrates the orientation of the guide roller 17 relative to the bead. As shown best in FIG. 3, the first surface 21 of the guide roller 17 has a frusto-conical shape, and is connected to the second surface 22 through the fillet 23. The second surface 22 has a frusto-conical surface section 60 and is a spherical surface section 61. The angle of the opening between the frusto-conical section 60 and the frusto-conical section of the first flank 27 is approximately 90°, and the spherical surface section 61 of the second surface 22 is further away from the axis 62 of the guide roller 17, than the frusto-conical upper surface 21. Through this configuration, an additional pulling force is placed on the tire bead by the spherical surface section 61 of the second surface, because section 61 has a higher circumferential speed than the frusto-conical surface 21. The arrangement of the fillet 23 and the frusto-conical surface 60 provides a free space for the elastically deformed bead.

As shown in FIG. 4, the arrangement of the guide roller 17 is such that the rolling plane 63 of the spherical surface section 61 is a secant 64 in relation to the bead circle 65. Simultaneous turning of the vehicular pneumatic tire 1 and guide roller 17 with a differential speed, as explained above, starts a continuing deformation effect which is increased through the different circumferential speeds of the surface section 61 and the frusto-conical surface section 60. This secant positioning causes a self-positioning effect of the guide roller 17 during the application of the vertical force via the cylinder system 18 on the bead area of the vehicular pneumatic tire 1 via the first surface 21. As explained above, an additional hold-down of the guide roller 17 is not needed because the guide roller axis 62 does not point towards the center of the tire.

The modified guide roller shown in FIG. 5 is especially preferred when the side wall of the tire is unusually stiff due to manufacturing conditions. Modified guide roller 17A is also used when the angle between the tire side wall and tread is greater than 90° and less than 180°. The spherical shape of the first surface 70 of roller 17A increases pull-up of the side wall of the tire without reducing the deformation effect caused by the interaction of the spherical surface section 61 and surface 70 together with the free space in the area of the fillet 23 and frusto-conical surface 60. Additionally, the first surface 70 causes an increase of the vertical force applied to tire.

The sectional view of FIG. 10 illustrates another arrangement for the mounting of a vehicular pneumatic tire 1 on vehicular rim 6 secured in place on base 31 by hold-downs 24 and/or clamping jaws 9. Vertically movable post 33 carries a plunger 75 having a plate 76 fastened to the lower end thereof. Plunger 75 moves in a vertical direction and rotates in both clockwise and counter-clockwise directions which enables manipulation of adjustable holding hooks 77 which grab behind the bead 3 of the vehicular pneumatic tire as shown in FIG. 11.

As shown in FIGS. 10 and 11, the adjustable hooks 77 are fastened to the plate 76 by joints 78. By turning the plate 76 counter-clockwise (left), the joints 78 are eccentrically arranged relative to axis of rotation 79 and the outer ends of hooks 77 whereby the radial distance between the axis 79 and the hook ends is shortened. The bead 3 of the vehicular pneumatic tire 1 is deformed to the point where the bead has a smaller diameter than the wheel flange 4. The result of the turning of plat 76 around the axis of rotation 79 and the resulting reduction of the diameter of the bead 3 can also be obtained if the plate and the liftable and lowerable plunger are stationary, and the tire is rotated. This also causes a deformation through shortening of the effective length of the adjustable holding hooks 77. Here again when the diameter of the deformed bead 3 is smaller than the wheel flange diameter, the bead 3 is easily moved past the wheel flange 4 toward the rim. Once the tire bead is between the rim flange and the central plate, counter rotation of the plunger 75 or the vehicular pneumatic tire causes a relief of the adjustable holding hooks 77. When the bead 2 or 3 is secured in the interior rim, groove 7 and 8 through lowering of the plunger 75 the hooks can e removed from within the rim through the space between groove 7 or 8 and beads 3 and 2. Turning the liftable and lowerable plunger 75 causes a reduction in effective length of the adjustable holding hooks 77 which now can be removed from the mounted wheel. To accommodate various bead diameters, adjustable holding hooks 77 are provided, as explained above.

Figure 12:
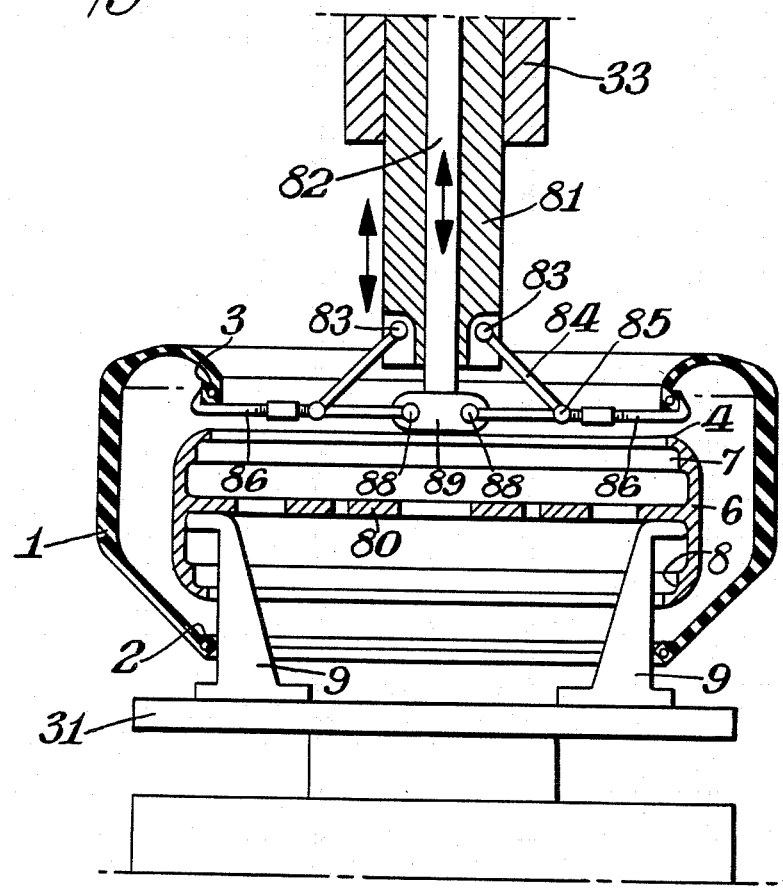
FIG. 12 is a front elevational view of another tire mounting and demounting device, according to the present invention, with the arms thereof extended.
Figure 13:
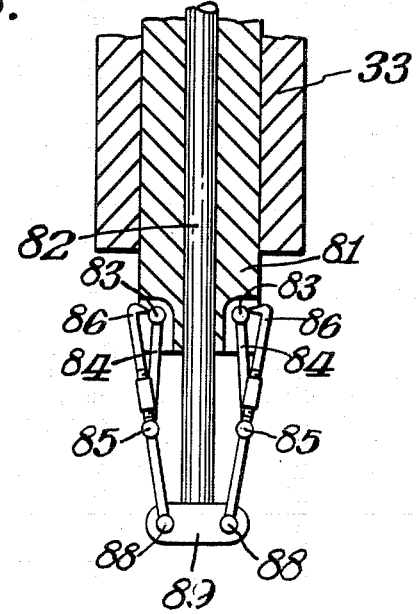
FIG. 13 is a view similar to FIG. 12 illustrating the arms of the mounting and demounting device in their withdrawn position.

FIG. 12 shows a further modification of a machine for mounting a vehicular pneumatic tire 1 on a vehicular rim 6. In this embodiment the vehicular rim 6 is secured to the base 31 by clamping jaws 9. A liftable and lowerable work post 33 carries a hollow shaft 81 within which a mushroom plunger 89 is assembled. Joints 83 are fastened to the shaft 81 and rods 84 are attached to the joints. The circumferential distance between the rods 84 is equal to or less than 90°. Rods 84 are connected to adjustable hooks 86 via joints 85. The outer ends of the adjustable hooks 86 grab the bead 2 or 3 from behind while the inner ends of the hooks are hinged at points 88 to head 89.

During the mounting process the mushroom plunger 82 is initially lowered so that the radial length of each adjustable hook 86 is shortened via the joints 85 until the diameter of the deformed bead 2 or 3 is reduced to the point where it can be moved past the wheel flange 4 in a direction of the central plate 80. In this instance, the shaft 81 is lowered while the mushroom plunger 82 is held steady. Next the mushroom plunger 82 is raised and the adjustable hooks 86 are thus released to thereby facilitate their removal from the area between the vehicular rim 6 and the wheel flange 4. After the adjustable hooks 86 have been disengaged from the bead 2 and 3, the shaft 81 is raised while simultaneously lowering the mushroom plunger 82. This manipulation removes the entire mounting device from the area of the finally mounting vehicular pneumatic tire 1.

For tire demounting with the apparatus of FIGS. 10–11 and FIGS. 12–13, contact is initially made in a directly opposite sequence. the adjustable hooks 77 or 86 are positioned behind the tire bead 2 or 3 and the assembly is then slightly lowered. The effective radial length of the adjustable hooks are then shortened, and the vehicular pneumatic tire 1 is demounted past the wheel flange 4.

What is claimed is:

1. A device for mounting a pneumatic tire to a rim or removing a pneumatic tire from a rim, the tire and rim having a common axis of rotation and the tire having a pair of spaced apart beads arranged to engage an interior circumferential rim surface spaced radially outward of inwardly extending rim flanges, the device comprising a housing, support means on the housing arranged to hold the tire and rim in a plane, means for rotating the support means about an axis that coincides with the axis of rotation of the tire and rim, a column extending parallel to said axis of rotation secured in place on the housing adjacent the support means and having a longitudinal axis and arranged to rotate about that axis, an outwardly extending arm pivotally connected at one end thereof to the column for movement in an upward and downward direction, a guide roller rotatably connected to the arm at an outer end thereof for rotation about an axis normal to a longitudinal axis of the arm, means for allowing rotation of the guide roller about the longitudinal axis of the arm and means for allowing rotation of the guide roller about its axis, and the guide roller having a first surface for engaging the tire bead and pressing it against the rim flange and a second surface radially outward of the first surface relative to the axis of the guide roller arranged to elastically deform the tire bead until the effective diameter of the deformed bead portion is reduced to the point where it is free to pass into or out of the interior of the rim past one of the rim flanges.

2. A device as in claim 1 wherein the first surface of the guide roller is frusto-conical having an axis that coincides with the axis of the roller, and the second surface is a spherical segment also having an axis that coincides with the axis of the roller, and a fillet between the first and second surfaces.

3. A device as in claim 1 wherein the first surface of the guide roller is a spherical segment having an axis that coincides with the axis of the roller, and the second surface is a spherical segment also having an axis that coincides with the axis of the roller, and a fillet between the first and second surfaces.

4. A device as in claim 1 including piston and cylinder means connected between the column and arm for raising and lowering the arm.

5. A device as in claim 1 wherein the support means includes clamping jaws for securing the tire rim in place.

6. A device as in claim 1 wherein the support means includes hold-down means anchored to the tire rim for securing the rim in place.

7. A device as in claim 1 wherein the guide roller includes an axis of rotation and a crowned area, the guide roller with the crowned area thereon working together with a bead circle of the pneumatic tire whereby a rolling plane of the crowned area of the guide roller represents a secant to the bead circle of the tire.

* * * * *